US009846886B2

(12) United States Patent
Greene et al.

(10) Patent No.: US 9,846,886 B2
(45) Date of Patent: Dec. 19, 2017

(54) STRATEGIC MODELING FOR ECONOMIC OPTIMIZATION OF GRID-TIED ENERGY ASSETS

(71) Applicant: Palo Alto Research Center Incorporated, Palo Alto, CA (US)

(72) Inventors: Daniel H. Greene, Sunnyvale, CA (US); Robert S. McHenry, Burlingame, CA (US); Bhaskar Saha, Redwood City, CA (US); Sylvia J. Smullin, Menlo Park, CA (US); David E. Schwartz, San Carlos, CA (US); Sean R. Garner, San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 406 days.

(21) Appl. No.: 14/074,571

(22) Filed: Nov. 7, 2013

(65) Prior Publication Data
US 2015/0127425 A1 May 7, 2015

(51) Int. Cl.
*G06Q 50/06* (2012.01)
*G06Q 30/02* (2012.01)
(Continued)

(52) U.S. Cl.
CPC ......... *G06Q 30/0202* (2013.01); *G06Q 10/04* (2013.01); *H02J 3/008* (2013.01);
(Continued)

(58) Field of Classification Search
None
See application file for complete search history.

(56) References Cited

U.S. PATENT DOCUMENTS 7,328,128 B2 * 2/2008 Bonanni ............ G05B 23/0283
702/182
9,020,649 B2 * 4/2015 Sharma ................... H02J 3/381
700/286
(Continued)

OTHER PUBLICATIONS

Cutter, E., E3 Energy+Environmental Economics, E3 Modeling Framwork Short, "+Valuing Storage", Oct. 2013. https://skydrive.live.com/?cid=d76fa719e5d148ee.
(Continued)

*Primary Examiner* — Beth V Boswell
*Assistant Examiner* — Letoria G Knight
(74) *Attorney, Agent, or Firm* — Shun Yao; Park, Vaughan, Fleming & Dowler LLP

(57) ABSTRACT

One embodiment of the present invention provides an energy-asset control system for utilizing an energy asset to provide one of more modes of operation services. The system includes an economic optimizer configured to identify at least one mode of operation opportunity based on current and/or future market conditions; a prognostics module configured to perform a prognostic analysis associated with the mode of operation opportunity for the energy asset using an existing model, and determine a confidence level associated with the prognostic analysis; and an operation controller. The economic optimizer is further to configured to, in response to the prognostics module determining the confidence level exceeding a predetermined threshold, determine an expected profit of the mode of operation opportunity based on outcomes of the prognostic analysis; and optimize, over a predetermined time period, a usage of the energy asset based on the expected profit of the mode of operation opportunity.

39 Claims, 5 Drawing Sheets

(51) Int. Cl.
*G06Q 10/04* (2012.01)
*H02J 3/00* (2006.01)
*H02J 3/32* (2006.01)

(52) U.S. Cl.
CPC ............... *H02J 3/32* (2013.01); *G06Q 50/06* (2013.01); *Y04S 10/54* (2013.01); *Y04S 50/10* (2013.01); *Y04S 50/14* (2013.01)

(56) References Cited

U.S. PATENT DOCUMENTS

| | | | | |
|---|---|---|---|---|
| 2009/0113049 | A1* | 4/2009 | Nasle | G05B 13/026 709/224 |
| 2010/0314942 | A1* | 12/2010 | Talkin | G06Q 50/06 307/41 |
| 2011/0054815 | A1* | 3/2011 | Xu | G01R 31/3606 702/63 |
| 2011/0137481 | A1* | 6/2011 | Manz | H02J 3/383 700/291 |
| 2012/0010758 | A1* | 1/2012 | Francino | G05B 17/02 700/291 |
| 2012/0215368 | A1* | 8/2012 | Sharma | H02J 3/32 700/287 |
| 2012/0296482 | A1* | 11/2012 | Steven | G06Q 50/06 700/291 |
| 2013/0024042 | A1* | 1/2013 | Asghari | H02J 3/381 700/295 |
| 2013/0134780 | A1* | 5/2013 | Parsonnet | H02J 3/005 307/25 |
| 2014/0039710 | A1* | 2/2014 | Carter | G06Q 10/06 700/291 |

OTHER PUBLICATIONS

Abrams, Alicia et al., "Energy Storage Cost-effectiveness Methodology and Preliminary Results", Public Interest Energy Research (PIER) Program, Interim/Final Project Report, Jun. 2013.

* cited by examiner

STRATEGIC MODELING FOR ECONOMIC OPTIMIZATION OF GRID-TIED ENERGY ASSETS

BACKGROUND

Field

This disclosure is generally related to grid-scale energy assets, such as solar panels, storage systems, back-up power generators, and loads capable of providing demand response. More specifically, this disclosure is related to assets that are capable of providing grid support, such as ancillary services. These assets may be exclusively devoted to providing grid support, or they may have a primary purpose, for example, of providing back-up power in a micro-grid; and grid support is provided in addition to their primary purpose.

Related Art

In traditional electricity markets, economic mechanisms are frequently used to arrive at accurate incentives and to dispatch services. For example, an operator of a power system, such as an independent system operator (ISO), may request bids up to 24 hours in advance of a desired service. In response to the request, one or more suppliers, such as a power plant, may bid to supply power or ancillary services (such as regulation, load following, spinning reserve, non-spinning reserve, replacement reserve and/or other services that help maintain power system stability in response to unanticipated variations in the supply and demand of electricity). Based on the received bids, the ISO may select or dispatch the services it needs to operate the power system or grid.

Modern day electrical grids often include alternative renewable energy resources, such as wind energy and solar power, in addition to traditional fossil-fuel-based power plants. However, these renewable energy resources may bring more uncertainty to the grid because the amount of energy produced by wind or sunlight varies with time, season, and random factors, such as weather. Hence, there is more need for ancillary services, which are traditionally provided by fossil-fuel-based power plants. However, regulation services produced by fossil-fuel-based power plants are expensive and can be slow to ramp up. Recently, various new energy assets have been incorporated into the grid. These assets include forms of grid-scale energy storage devices, such as large-scale batteries, super capacitors, flywheels, or plugged-in electrical vehicles. The purpose of these assets is to help stabilize the grid by providing dispatchable power and ancillary services from new sources on the grid.

SUMMARY

The present invention concerns the dual use of energy assets in a way such that they serve both their primary purposes as well as providing grid support. To do this economically, it is beneficial to have an accurate model of the wear that an asset will experience when it is operating, especially when it is providing grid support.

One embodiment of the present invention provides an energy-asset control system for utilizing an energy asset to provide one of more modes of operation services. The system includes an economic optimizer configured to identify at least one mode of operation opportunity based on current and/or future market conditions; a prognostics module configured to perform a prognostic analysis associated with the mode of operation opportunity for the energy asset using an existing model, and determine a confidence level associated with the prognostic analysis; and an operation controller. The economic optimizer is further to configured to, in response to the prognostics module determining the confidence level exceeding a predetermined threshold, determine an expected profit of the mode of operation opportunity based on outcomes of the prognostic analysis; and optimize, over a predetermined time period, a usage of the energy asset based on the expected profit of the mode of operation opportunity.

In a variation on this embodiment, while optimizing the usage of the energy asset, the economic optimizer is configured to perform an economic transaction which involves placing a bid for the mode of operation opportunity and receiving a notice that the bid is accepted. In response to the economic transaction, the operation controller is configured to place the energy asset in an operation mode associated with the mode of operation opportunity.

In a variation on this embodiment, the economic optimizer is further configured to, in response to the prognostics module determining the confidence level below the predetermined threshold, identify one or more focused tests. The energy-asset control system further comprises a focused testing module configured to perform an identified focused test for the energy asset based on the mode of operation opportunity, and improve the existing model based on outcomes of the focused test, thereby enabling better future prognostics for the energy asset.

In a further variation, the prognostics module is configured to perform a second prognostic analysis using the improved model. The economic optimizer is further configured to perform an economic optimization based on outcomes of the second prognostic analysis.

In a further variation, while identifying the one or more focused tests, the economic optimizer is configured to perform one or more of the following economic analyses: a sensitivity analysis, an entropy measure analysis, and a decision theoretic analysis.

In a further variation, the focused test includes one or more of: an online test, an offline test, and a laboratory test.

In a further variation, the system further includes a model library configured to store the improved model.

In a variation on this embodiment, the economic optimizer is configured to, in response to the determined confidence level below the predetermined threshold, place an exceptionally large bid. The system further comprises a focused testing module. In response to the large bid not being accepted, the focused testing module is configured to perform a focused test for the energy asset based on the mode of operation opportunity, and improve the existing model based on outcomes of the focused test, thereby enabling better future prognostics for the energy asset.

In a variation on this embodiment, the energy asset includes a grid-tied energy storage device. The grid-tied energy storage device includes a heterogeneous mixture of energy storage devices that includes one or more of: a flywheel, a super capacitor, a plugged-in electrical vehicle, a Li-ion battery, a lead-acid battery, a nickel metal hydride (NiMH) battery, a flow battery, a new battery, and a used battery.

In a further variation, the existing model includes one or more of: a battery cell-level model, a battery pack-level model, and a circuit-based archetype battery model.

In a further variation, the prognostic analysis is performed based on a current health condition of the grid-tied energy storage device.

In a variation on this embodiment, the mode of operation opportunity includes one or more of: energy arbitrage, voltage support, contingency reserves, frequency control, and regulation.

In a variation on this embodiment, the energy asset includes one or more of: a battery, a backup energy generator, a fuel cell, and a demand-response load management system.

BRIEF DESCRIPTION OF THE FIGURES

In the figures, like reference numerals refer to the same figure elements.

DETAILED DESCRIPTION

Figure 1:
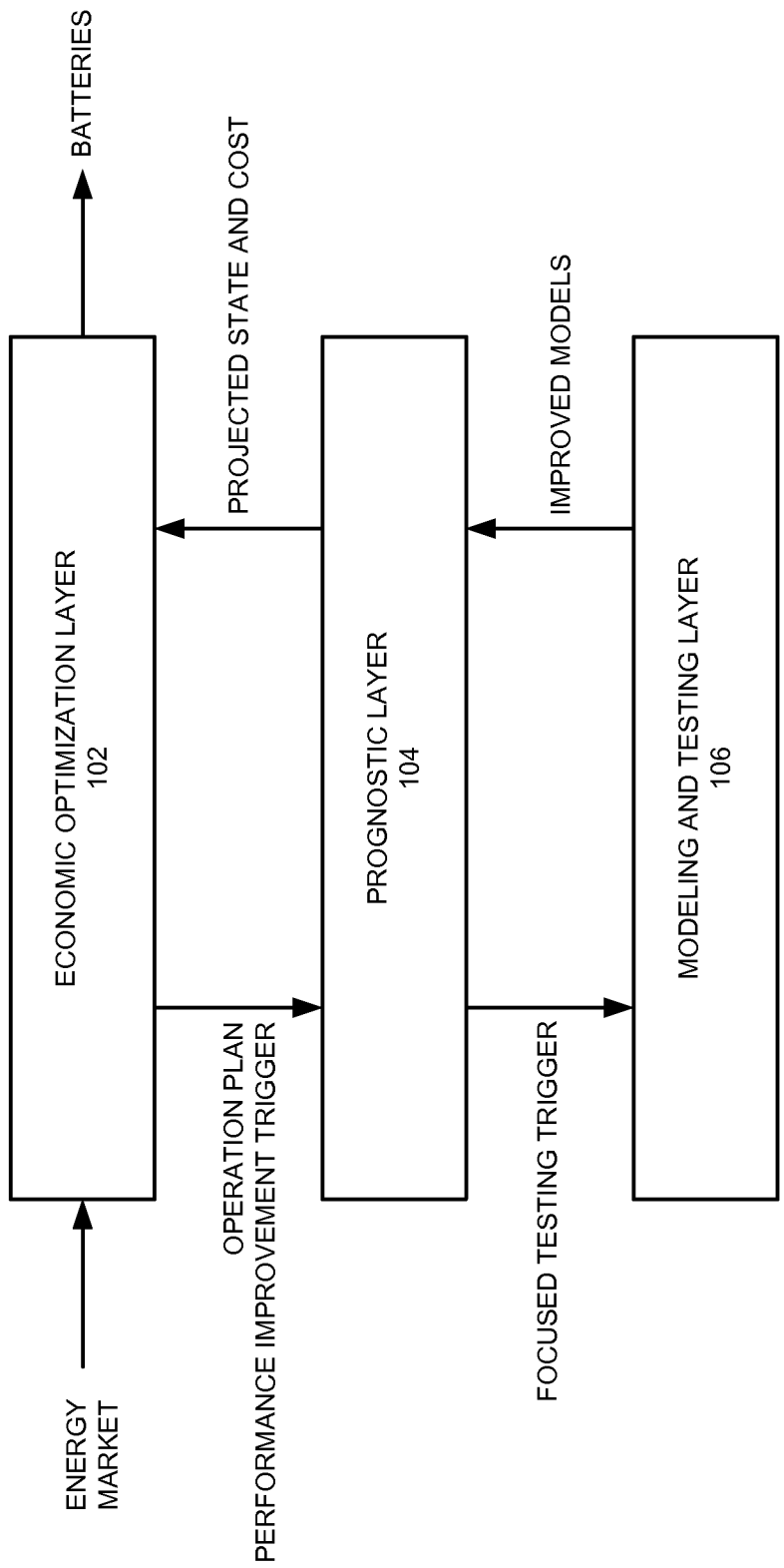
FIG. 1 presents a diagram illustrating an exemplary high-level architecture of the multi-mode energy-storage-management system, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a multi-mode energy-asset-management system that concurrently analyzes the market service opportunities and projects the cost-benefit metrics of responding with available energy asset installations. More specifically, the multi-mode energy-asset-management system includes an economic optimization layer, a prognostic layer, and a modeling and testing layer. The economic optimization layer is responsible for computing the optimal tradeoff between revenue and lifecycle cost in the form of a multi-mode bidding strategy. The prognostic layer tracks the current state of the energy asset by automatically adapting the model parameters of the energy asset using run-time data, and projects the asset's state based on the load regimes in a given operation profile. The modeling and testing layer provides the underlying models and executes the focused testing protocol, which can be used to provide state-of-charge (SOC) and state-of-health (SOH) estimates. SOC is the currently available capacity, usually expressed as a percentage of a battery's maximum capacity. SOH is a measure of the current condition of the battery, usually expressed as a percentage of the measure of the condition of a new battery, or the battery's original specification. While SOC and SOH are often used to refer to chemical batteries, the terms can equally apply to other energy assets in reference to the amount of energy available and the fraction of the total life of the asset that has been used. In addition to storage devices, additional examples of the energy asset include, but are not limited to: a back-up generator, a fuel cell, a residential load, an industrial load, or a military load. The corresponding wear model of these assets can include key elements of the assets, such as motors, bearings, seals, turbines, membranes, etc.

Multi-Mode Energy-Storage-Management Framework

Modern electricity markets have effective ways of addressing grid stability and bottlenecks. More specifically, ISOs can purchase ancillary services, such as frequency regulation, contingency reserves (such as spinning reserve, supplemental reserve, and replacement reserve), and voltage support. Traditionally, ancillary services were provided by power plants; now, however, demand response and grid-scale energy-storage devices, such as grid-tied batteries, can also provide these ancillary services. Modern markets and recent policy changes make it possible and profitable to incorporate these new sources of ancillary services into grid operations. However, there are very few large-scale deployments of batteries currently on the grid due to the uncertainty about their profitability. Operating the batteries in only one mode does not produce enough revenue, and it is hard to figure out how to optimally deploy batteries in multiple operating modes. For example, without dynamic knowledge of battery state and wear, it can be challenging to make a choice between using a battery for frequency regulation or energy arbitrage. Hence, traditionally, grid-scale batteries are merely used in a simple mode of operation, such as night-to-day arbitrage (charging during nighttime lows and discharging during daytime peaks). This significantly underutilizes the batteries. To solve this problem, embodiments of the present invention provide a multi-mode energy-storage-management system that is capable of optimizing battery usage among several operation modes (including, but not limited to, voltage support, contingency reserves, frequency regulation, and energy arbitrage) based on market conditions. More specifically, the multi-mode energy-storage-management system couples the economic control algorithms with strategically driven improvements in battery modeling, including both diagnostic modeling (which provides current SOC and SOH information) and prognostic modeling (which can stochastically predict the degradation trajectory of the batteries).

FIG. 1 presents a diagram illustrating an exemplary high-level architecture of the multi-mode energy-storage-management system, in accordance with an embodiment of the present invention. In FIG. 1, multi-mode energy-storage-management system 100 includes an economic optimization layer 102, a prognostic layer 104, and a modeling and testing layer 106.

Economic optimization layer 102 is responsible for choosing a strategy for controlling the use of the battery and choosing at any given time among multiple modes of operation (e.g. regulation ancillary services or energy arbitrage) to meet grid needs. Economic optimization layer 102 makes choices in the present and for the future, taking into account opportunity costs and feasibility of each choice in the future. It typically determines an operating strategy that may include several modes of operation. For example, economic optimization layer 102 may decide to charge a battery at night, offer reserve capacity in the early afternoon, and then discharge the battery in the evening. The optimization needs to take into account both the economic rewards and the cost in battery wear if the battery is deployed. If the battery's primary purpose is back-up, with grid support being a secondary service, then economic optimization layer 102 also considers the economic rewards and requirements of the primary purpose when it chooses profitable grid-support strategies, so that battery deployment will be consistent with the primary purpose of the battery. The optimization can also consider the ability of the asset for delivering what is required (in terms of power, energy, and/or speed of response, for example) for a certain deployment and its ability to meet future commitments. To do so, the optimization has to deal with both the uncertainty in future electricity market prices and the uncertainty in battery charge and health. In addition, it should be able to plan both day-ahead and immediate spot market operations. In some embodiments, economic optimization layer 102 selectively identifies where improvements in battery health modeling would be most beneficial to improving the optimization results, and prompts prognostic layer 104 to perform focused modeling and testing. For example, it is likely that fast-acting regulation services will exercise batteries in ways that are less well-understood or predictable than arbitrage, and it is likely that mixing battery modes will exercise batteries at partial states of charge that are even less well-understood. While in operation, economic optimization layer 102 may identify battery-operating modes that are likely to have high economic value based on current market conditions. For example, the current price for providing frequency regulation may be high. However, an operator may choose to not bid into this market if it is not understood how such battery deployment will impact SOH of the battery. In day-ahead markets, where there is uncertainty about the price for an ancillary service and uncertainty about battery wear, an operator may place an exceptionally large bid to reduce the likelihood that winning the bid will result in an unprofitable operation. Note that deployment of a battery is profitable only when the cost for running the battery is less than the economic reward for providing the ancillary service. While there is uncertainty in both cost and reward, economic optimization layer 102 can operate the asset in a way such that over time, it is expected to be profitable. If the battery wear is poorly understood, proper risk assessment cannot be achieved, resulting in many opportunities lost due to no-bid or excessively high-bid participations in the markets. In order to obtain battery health information associated with these battery-operating modes, economic optimization layer 102 prompts prognostic layer 104 to perform focused modeling and testing for those battery-operating modes. The term "focused" is used to indicate that the prognostic work is directed where it will be most beneficial, with no attempt to be comprehensive. Based on the focused modeling and testing result, prognostic layer 104 provides economic optimization layer 102 with projected state and cost associated with those operating modes. The interaction between economic optimization layer 102 and prognostic layer 104 can accelerate the improvement of optimization results over time.

Note that conventional approaches that use grid-scale batteries in a variety of modes supporting the grid do not dynamically optimize the choice of battery-operating mode to maximize economic benefits. The economic value of multi-mode use of batteries for grid storage has been studied, see for example "Benefit Analysis of Energy Storage: Case Study with Sacramento Municipal Utility District," EPRI, Palo Alto, Calif., 2011, Report number 1023591; and "Electricity Energy Storage Technology Option: A White Paper Primer on Applications, Costs, and Benefits," EPRI, Palo Alto, Calif., December 2010, Report number 1020676; but these studies do not describe the operational optimization of the battery use. In contrast, embodiments of the present invention are able to continually capture battery information needed for economic optimization and improve the prognostic model using the captured runtime battery information. More specifically, economic optimization layer 102 runs a deployment model, which summarizes the details of the lower level models and is linked with prognostic models run by prognostic layer 104. In one embodiment, a battery-asset-assessment module (not shown in FIG. 1, and show later as module 306 in FIG. 3) converts the prognostic system health information into cost information based on situation-specific battery capital and maintenance costs. The cost of battery deployment in a given mode at a given time depends on the battery's SOC and SOH at that time, as well as the actual mode of operation. The specific amount of expected wear on the battery translates into a cost for each possibility for battery deployment and that expected cost is compared, at economic optimization layer 102, to the expected revenue from the opportunity. If the economic optimization layer finds a strategy where the expected revenue is higher than the cost for running the battery, economic optimization layer 102 can determine that deploying the battery is likely to be profitable, and may then bid in accordingly. Note that it is also possible for the cost of deploying the battery to be balanced by the profit over various time periods. In some embodiments, economic optimization layer 102 may choose to run the battery unprofitably during a particular time period if the system is profitable over a longer period of time.

The modes of battery operation are tied to the local electricity markets. In some embodiments, economic optimization layer 102 runs general-purpose deployment models that are customized to local electricity markets, and thus are capable of supporting variations in ancillary service definitions and local price uncertainty. In one embodiment, economic optimization layer 102 uses a form of model predictive control (MPC) to plan the battery operation, i.e., optimizing the operation profile of the model over a finite horizon. For example, economic optimization layer 102 might plan to charge the battery at 2 am, bid on providing regulation service at 1 pm, and then sell power in a spot market at 7 pm. The operation plan is continually revised, and economic optimization layer 102 is expected to produce the most profitable plan taking into account battery wear over some period of time. In the above example, the plan to bid for providing regulation at 1 pm would be pursued only when the clearing price is expected to be high enough to recover the cost incurred by the expected wear on the battery and make a profit. The economic optimization will chose the most profitable plan.

One key feature of multi-mode energy-storage-management system 100 is that economic optimization layer 102 plays a part in focusing improvements in prognostic performance by interaction with prognostic layer 104. The modes of operation needing improved understanding will be chosen based on the operation of economic optimization layer 102. In some embodiments, economic optimization layer 102 uses one or more entropy measures, sensitivity analyses, and decision theoretic approaches to choose where prognostic modeling and testing should be focused by prognostic layer 104, which then prompts modeling and testing layer 106 to perform the corresponding focused test. The objective is to focus where information gain and economic benefits would be highest. In practice this means that the prognostic efforts will likely focus on the grid service opportunities and temporal spacing issues where wear is less well-understood.

In addition to choosing where to focus prognostics, economic optimization layer 102 can also use explore-exploit techniques to operate in patterns that may be sub-optimal for immediate performance but would gather data to help with prognostics improvements. The focused prognostics can include both offline modeling and testing, and online data gathering from explore-exploit operations. The offline modeling and testing is the primary prognostics activity, which involve disconnecting the asset from grid operation for the purpose of performing tests (e.g. a specialized state of health measurement). In some embodiments, the offline testing may involve running a computer simulation. In some embodiment, the offline testing may involve physically testing the batteries of the same type in a laboratory setting. During the explore-exploit operations, the batteries are placed in sub-optimal operation modes and online data associated with these sub-optimal operation modes are gathered. For example, an online test might involve operating an asset connected to the grid in a particular pattern and measuring a characteristic of the asset (e.g. temperature or state of charge) after it is used. Such online data gathering can potentially further accelerate the rate at which the prognostics are improved.

Prognostic layer 104 employs a model-based technique to accurately estimate and track the current state of the battery (both SOC and SOH), and subsequently uses this estimate to predict the lifecycle cost (health degradation) for operating the battery in a given operational mode profile. During operation, prognostic layer 104 receives, from economic optimization layer 102, an operation plan and a performance improvement trigger, which indicates that the prognostic results can be improved to better realize revenue opportunities in the market. In response, prognostic layer 104 identifies the region of the battery state space that needs to be modeled better and sends the appropriate focused modeling and testing trigger to the modeling and testing layer 106. In addition, prognostic layer 104 can periodically receive sensor data while the batteries are in operation and compare the received runtime data with the prognostic predictions in terms of the SOC and SOH of the batteries. If there is a mismatch, prognostic layer 104 may trigger modeling and testing layer 106 to perform corresponding focused tests, and the results of the focused tests may be used to improve the prognostic modeling.

Battery prognostics has been part of the broader effort in battery health monitoring because estimating battery lifetime for intended use is central to the return on investment (ROI) analysis. Often this is represented as cycle life as a function of depth-of-discharge (DOD) for a fixed rate discharge. Many different approaches have been taken in estimating battery lifetime. For example, statistical parametric models can be built to predict time to failure, and impedance spectrometry can be used to build battery models for cranking capability prognostics. In addition, state-estimation techniques, such as the Extended Kalman Filter (EKF), have been applied for real-time prediction of SOC and SOH of automotive batteries. As the popular cell chemistries changed from lead acid to nickel metal hydride (NiMH) to Li-ion, cell characterization efforts have kept pace. Dynamic models for Li-ion batteries that take into consideration nonlinear equilibrium potentials, rate and temperature dependencies, thermal effects, and transient power response have been built. Automated reasoning schemes based on neuro-fuzzy and decision theoretic methods have been applied to fused feature vectors derived from battery health sensor data to arrive at estimates of SOC and SOH. However, it remains difficult to accurately predict the end-of-life (EOL) of a battery from SOC and SOH estimates under environmental and load conditions different from the learning dataset. To do so, advanced prognostic algorithms are needed.

Prognostic approaches can be broadly classified into two categories: data-driven and model based. Data-driven techniques mainly exploit evolution trends of the tracked variable observed from training or archived data under similar operational conditions. Although these techniques circumvent the costly need for domain expertise and modeling, they lead to the problem of data availability and integrity, especially for new applications. This motivates the development of model-based techniques where domain expertise may be brought to bear. Most high-fidelity models are too computation-intensive to run in an online environment that can be integrated with the optimization and decision-making process, as well as being cost prohibitive to generate. Hence, it is desirable to have a model-based prognostic framework that can track the nonlinear dynamics of the system health while using a lower-order system representation of a battery-aging model.

Prognostic layer 104 is responsible for the formulation of the battery models that retain physical significance while achieving computational tractability. Moreover, prognostic layer 104 includes a model adaptation module (not shown in FIG. 1), which updates the battery models with run-time data. Model adaptation also plays an important role in battery prognostics because parameter values may differ from one battery to another, or for the same battery from one cycle to the next. Furthermore, for any given cycle, the parameter values may be non-stationary. In some embodiments, nonlinear filters customized for battery applications are included in the model adaption module. These nonlinear filters, such as a Particle Filter (PF), can combine Bayesian learning techniques with importance-sampling to provide good state-tracking performance while keeping the computational load tractable. The idea is to represent the system state as a probability density function (pdf) that is approximated by a set of particles (points) representing sampled values from the unknown state space, and a set of associated weights denoting discrete probability masses. The particles are generated from an a priori estimate of the state pdf, propagated through time using a nonlinear process model, and recursively updated from measurements through a measurement model. The main advantage of PFs here is that model parameters are included as a part of the state vector to be tracked, thus performing model identification in conjunction with state estimation. Whenever prediction is desired, one may run the model with the latest updated parameter values to get the desired operational trajectory under expected loads. The weights associated with these trajectories can be used to compute the remaining useful life (RUL) distribution of the battery. Given this prognostic capability, it is possible to use the RUL pdfs in a decision-theoretic framework inside the system manager to optimize battery use.

In some embodiments, whenever prediction is desired for evaluating an operation plan, prognostic layer 104 runs the battery model over the desired time-horizon with the latest updated parameter values to limit the uncertainty bounds and to get the desired SOH trajectory under expected loads. Prognostic layer 104 can further use these trajectories to compute the remaining useful life (RUL) of the battery as a time distribution when the SOH is degraded beyond acceptable limits. Given this prognostic capability, these RUL probability density functions (pdfs) will be compared to expected cycle-life to derive the lifecycle cost that can be further used as an input to economic optimization layer 102, as shown in FIG. 1. The time-horizons for prognostics demanded here can range from minutes to years, as the battery SOC in the near future is needed to plan deployment in the short-term and long-term SOH predictions are a key driver of all economic optimization decisions.

Requirements sent from economic optimization layer 102 to prognostic layer 104 include the operation profile (such as operation modes as a function of time) and the desired accuracy and precision of the prognostic output. When these requirements are not met, either economic optimization layer 102 or prognostics layer 104 can trigger additional testing. If there is prompting for improved prognostics from economic optimization layer 102, prognostic layer 104 can improve its prognostics by triggering modeling and testing layer 106 to perform focused testing. Note that the term "focused testing" indicates that this prompt-driven approach does not need to explore the whole space of battery operation, but can focus on the regions of highest expected economic payoff. In one embodiment, prognostic layer 104 receives a performance improvement trigger from economic optimization layer 102 and propagates such triggers to modeling and testing layer 106 in order to initiate the focused testing.

In the system shown in FIG. 1, prognostic layer 104 estimates battery electrical response and degradation behavior using an underlying electrochemical battery model provided by modeling and testing layer 106. Because of its inherent learning ability, prognostic layer 104 does not require the underlying model to be tightly coupled to the physical characteristics of the battery. However, a more accurate model can reduce the parameter space and computational requirements as well as increase the convergence speed and confidence of the prognostics algorithm. This tradeoff delineates the working space for defining the battery model.

To ensure general applicability and longevity of the system, the battery model should be adaptable to new pack configurations and cell types without assuming a significant availability of manufacturer- or user-supplied measurement data. To do so, focused testing routines that can aid in refining the model in the context of a specific implementation are needed. In some embodiments, prognostic layer 104 includes a library of refined models, organized by cell category (chemistry, configuration, etc.) that can be used as starting points for future implementations. Note that a cell, also known as an electrochemical cell, is a basic building block of a battery. Each electrochemical cell is capable of deriving electrical energy from chemical reactions. A battery pack includes a set of individual battery cells (which are often identical) that are electrically interconnected. Note that, here we use batteries as an example for the energy asset and battery models are used for prognostics, in practice, other types of energy asset can also be used and managed by the system to provide regulation services. Examples for the energy asset include, but are not limited to: various energy storage devices (such as flywheels, super capacitors, plugged-in electrical vehicles, batteries based on chemical or mechanical energy storage, etc.), back-up energy generators (such as fuel cells), and loads that can be used for demand response (such as residential loads, industrial loads, and military loads). The corresponding models of these assets used for prognostics can include key elements of the assets, such as motors, bearings, seals, turbines, membranes, etc.

Models of electrochemical cells range from high-fidelity physical models that include detailed electrochemical and physical processes to analytical models that are essentially phenomenological descriptions of cell behavior agnostic to the underlying chemistry and physics. The former type of model can provide precise insight into cell behavior but has large numbers of parameters, is specific to cell chemistry and geometry, and depends on physical parameters that are not easily measured. The latter type of model is structurally simpler, but is not easily determined by experimental measurements, instead relying on aggregated statistics. Analytical models may allow little or no insight into internal details of battery condition. On the other hand, circuit models represent an intermediate framework capable of capturing electrical behavior with reasonable fidelity without detailed geometrical and chemical information, and can be used to form the basis of a generalized archetype model.

Cell-to-cell variation makes the extension of cell models to battery pack models difficult. While accurate models have been built from detailed component cell information, simplistically combining cells into packs using nominal parameter values is insufficient. Moreover, as the number of cells grows, such as the case of grid-scale battery packs, the modeling complexity increases significantly. In addition, in some battery packs, access to the battery or cell is only possible through supporting electronics, such as a battery management system. In these cases, the model may need to include effects of these electronics.

It has been shown that model parameters can be determined by extensive measurement of cells and packs. Battery tests can range from charge cycling to physical analysis of disassembled cells. However, such testing can be extremely time-consuming, may require destruction or significant wear of a cell, and, because of cell variability and the complexity of multi-cell interactions inside a pack, have limited usefulness in a generalized model. There is thus a need for a more focused testing methodology to evaluate targeted parameters in a context-sensitive manner. In some embodiments, modeling and testing layer 106 is responsible for defining a circuit-like archetype battery model; performing initial testing to prequalify the model; constructing a battery pack model based on an array of cell models; performing focused testing to refine the parameter space, improve convergence, and improve confidence of the model; and building the refined model into a library of cell and battery category models that can be used as initial models in future implementations.

Figure 2:
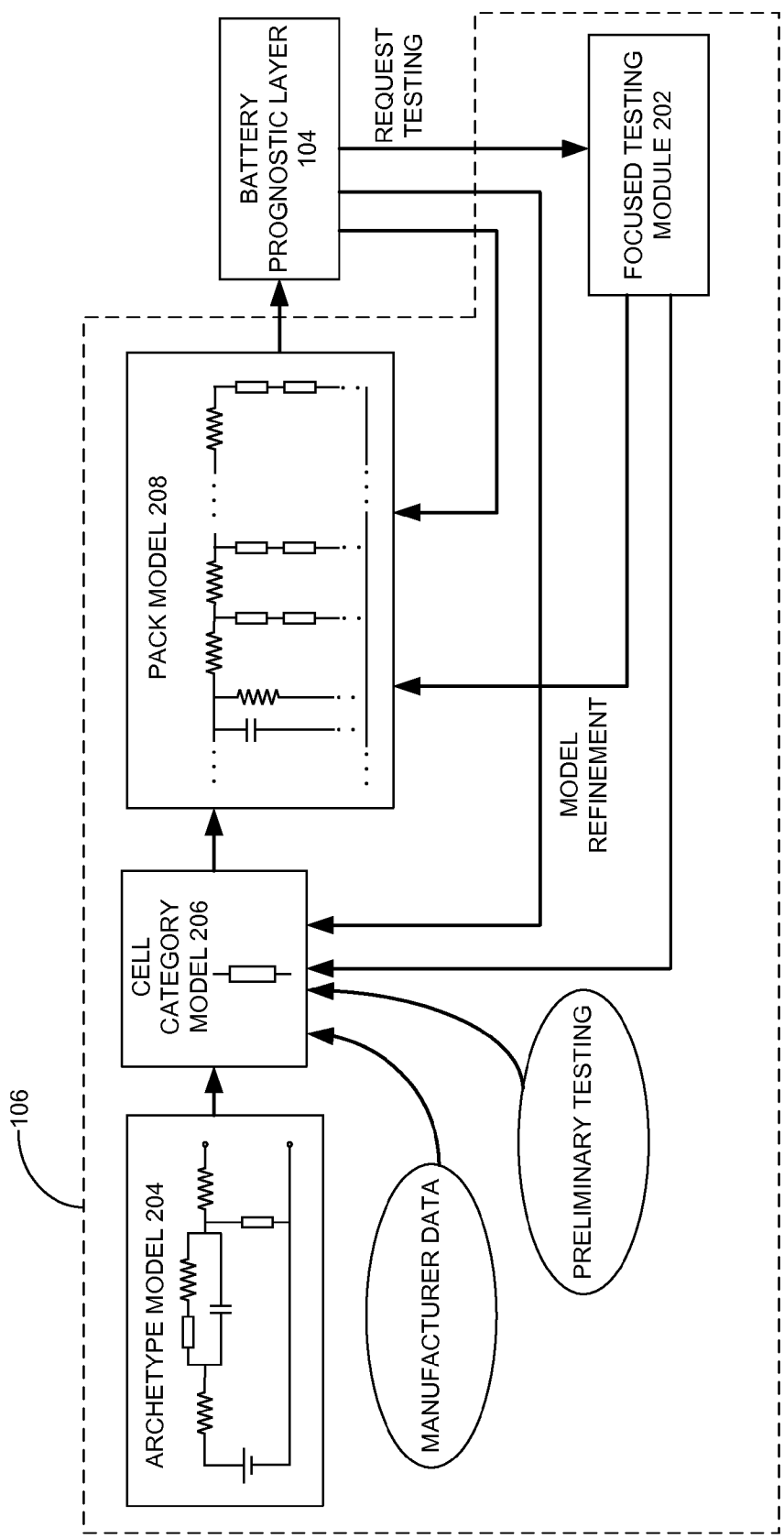
FIG. 2 presents a diagram illustrating an exemplary modeling framework, in accordance with an embodiment of the present invention.

FIG. 2 presents a diagram illustrating an exemplary modeling framework, in accordance with an embodiment of the present invention. FIG. 2 illustrates the modeling framework for batteries, it will be understood that the framework can also be applied to other types of energy asset, such as flywheels, back-up generators, and loads used for demand response. In FIG. 2, only prognostic layer 104 and modeling and testing layer 106 are illustrated. More specifically, FIG. 2 illustrates that modeling and testing layer 106 includes a focused testing module 202 and a number of models, such as an archetype model 204, a cell category model 206, and a pack model 208.

As described beforehand, archetype model 204 can be adapted from a circuit-based model that captures the electrochemical behavior of any cell types, which can include polymer Li-ion, lead-acid, and NiMH; and can be adapted to include non-stationary behavior, such as recovery effect, which is a non-linear effect resulting from the fact that chemical substances in a battery can replenish themselves if left idling for sufficient duration. In one embodiment, the specific circuit elements are derived based on equations that represent physical and electrochemical phenomena in the cell, such as reaction kinetics and electrode film formation. Cell degradation can be incorporated by allowing parameters to vary as functions of the major sources of change in cell behavior, such as time, temperature, and discharge rate. The form of these functions is determined by the physical degradation mechanisms they represent. For example, Li-ion cells have been shown to have temporal degradation that varies either as time or as the square root of time depending on the operating conditions. Hence, terms representing both cases can be included in archetype model 204.

One important feature of archetype model 204 is that it has enough parametric breadth to be adaptive to multiple battery types and chemistries. As the model is built up and refined for specific cell chemistries and individual cells, parameters determined to be irrelevant for the cell in question can be disregarded or eliminated, simplifying the model. For example, the above-mentioned equations for temporal degradation are based on studies of a specific Li-ion chemistry and may not be present in other cell types.

While a basic archetype model based on little or no initial data can be a starting point for the prognostic work, faster convergence can be achieved with a better-qualified model. Such models can be organized into categories at different levels of specificity. For example, categories may be defined by chemistry, form-factor, or manufacturing batch. As shown in FIG. 2, these category models, such as cell category model 206, can be built up from archetype model 204 using whatever data are available from the cell manufacturer or other sources, augmented by the output of standard measurements, such as constant and pulsed discharge and electrochemical impedance spectroscopy at different temperatures. They can also be extracted from prior instantiations of the full prognostics system. Category models, such as cell category model 206, can be applied as initial models in system deployments that utilize cells in the category, or as bases for category models of new cell types with similar characteristics. In one embodiment, cell category model 206 includes category models for the Li-ion and lead-acid batteries. These category models are developed using data from the cell manufacturers and measurement data of cells, modules, and full battery packs. They can form the basis of a library of category models aimed at preserving in functional form the machine learning obtained in system deployments. Moreover, cell category model 206 can be refined based on outputs of focused testing module 202 and prognostic layer 104.

Pack model 208 can be obtained by combining cell models based on configuration of the pack. Pack model 208 also includes additional elements that represent components of the battery management system (BMS), interconnects, and pathological elements, such as failed cells. Cell category model 206 and pack model 208 can be adapted and refined in operation as driven by the needs of the economic optimization layer 102 (not shown in FIG. 2) and prognostic layer 104. The system will take advantage of the learning ability of the prognostics module by reducing the number of elements in pack model 208 subject to acceptable convergence time and confidence. Over time, usage data will also contribute to the refinement of the underlying cell model.

Focused testing module 202 is responsible for performing a set of focused tests that are aimed at improving confidence in specific parameter values in the context of specific modes of battery operation. This is in contrast to the exhaustive testing of many cells that is conventionally used for model development. Note that exhaustive testing is extremely time- and resource-intensive, not extensible from a general cell-type to a specific cell, and not available with a deployed resource. Focused testing, on the other hand, can be selectively employed to extract specific parameters in a given implementation. In some embodiments, focused testing module 202 performs a focused test based on intersections of the operational mode defined by economic optimization layer 102 with specific unknown variables of pack model 208. More particularly, the focused test can be derived from a combination of load profiles representing different modes of operation in combination with specific unknown model parameters and the battery SOC and SOH. For example, a focused test may include a charge-discharge sequence starting at a certain SOC representing the effect of a particular mode of frequency support on a certain cell impedance parameter. In some embodiments, focused testing module 202 may perform the focused tests by taking the battery offline or performing laboratory tests on individual cells, modules, or packs of the same type. In some embodiments, focused tests may include comparing the battery SOH at the beginning and the end of a charge-discharge sequence or series of such sequences, for example, through physical inspections or Coulombic efficiency measurements.

There are multiple interdependencies among the economic optimization layer, the prognostic layer, and the modeling and testing layer. On one hand, experimental work (including online/offline testing and laboratory testing) performed by the prognostics layer or the modeling and testing layer on cells and packs can be used to build a battery model, which will be used for prognostics of the batteries. On the other hand, the prognostic layer, as prompted by the optimization layer, may drive further testing during battery operation. This multiple dependency relationship is illustrated in more detail in FIG. 3, which presents a diagram illustrating a multi-layer operational control system, in accordance with an embodiment of the present invention.

Figure 3:
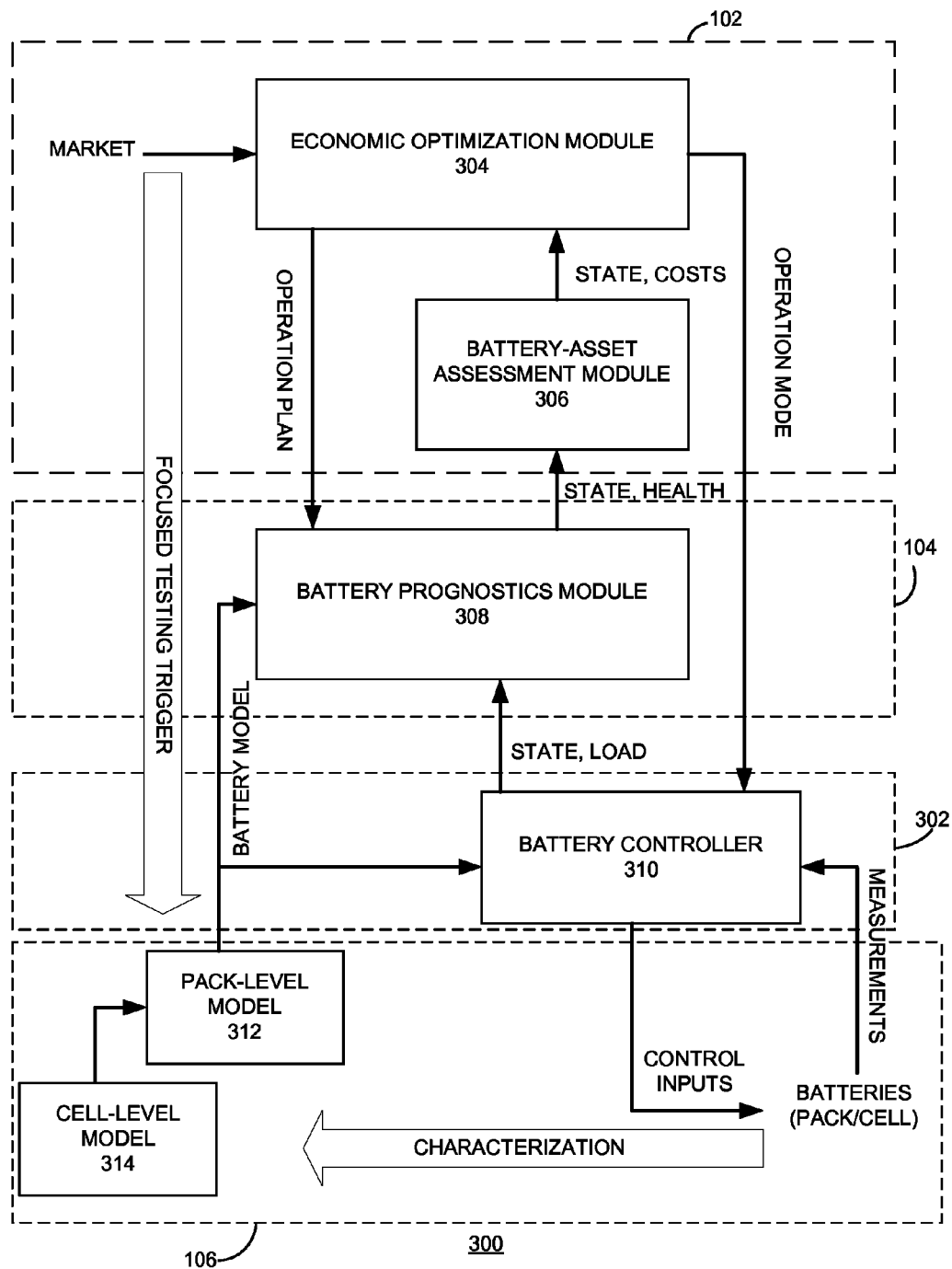
FIG. 3 presents a diagram illustrating a multi-layer operational control system, in accordance with an embodiment of the present invention.

In FIG. 3, operational control system 300 includes four layers: an economic optimization layer 102, a prognostic layer 104, a control layer 302, and a modeling and testing layer 106. Note that, compared with the high-level architecture shown in FIG. 1, FIG. 3 illustrates in more detail the interdependency among the layers and an additional control layer.

Economic optimization layer 102 includes an economic optimization module 304 and a battery-asset assessment module 306. Battery-asset assessment module 306 receives battery state and health information from battery prognostics module 308, and converts the health information into cost information based on situation-specific battery capital and maintenance costs. Based on market constraints and battery state and cost information, economic optimization module 304 computes the optimal tradeoff between revenue and lifecycle cost, and generates an operation plan that indicates the desired battery operation modes. In one embodiment, the system can bid in the ancillary services market based on the optimization outcome of economic optimization module 304. If the bid is accepted, the operation modes are sent from economic optimization module 304 to battery controller 310 to control the operation of the grid-tied batteries.

Multi-mode operation plans are sent to battery prognostics module 308, which performs battery prognostics for the various operational modes using state and load information provided by battery controller 310, and battery models provided by pack-level model 312 and cell-level model 314. These multi-model plans may be either plans under consideration by the economic optimization model, or plans chosen for bidding and possible execution. Note that initial modeling can be built upon experimental data as well as manufacturer data for cells, modules, and packs. Battery controller 310 receives measurements from and sends control inputs to the batteries. In one embodiment, an additional battery adaptor layer (not shown in FIG. 3) can be used to provide a uniform control framework between batteries and higher (control and optimization) layers. This adaptor layer allows the BMS for each cell, module, or pack to communicate with battery controller 310 using a single set of variables, which are identified during the development of the models and the battery prognostics module 308.

FIG. 3 shows that economic optimization module 304 can also trigger the performance of focused testing. In one embodiment, if economic optimization module 304 determines that there is not enough information to accurately determine the costs of placing the batteries in certain operation modes, economic optimization module 304 may propagate the focused testing trigger to modeling and testing layer 106. The focused testing trigger propagates through battery prognostics layer 104 and controller layer 302, during propagation the requested focused testing may be more specifically identified for modeling and testing layer 106. Modeling and testing layer 106 performs the focused testing, which can be used to improve the operation of battery prognostics module 308. Hence, the next time a similar service is offered, economic optimization module 304 will have more information with which to make an economic decision based on the increased prognostic confidence provided by the focused testing.

Note that although only one battery is shown in FIG. 3, in practice the system can actually optimize the use of individual non-identical energy storage assets, which include but are not limited to: battery packs (such as Li-ion battery packs, lead-acid packs, and nickel metal hydride (NiMH) packs), flow batteries, super capacitors, flywheels, and plugged-in electrical vehicles. The adaptive battery models and intelligent decision-making algorithms provide the benefit of enabling not only combinations of different chemistries, but also inclusion of a mixture of both new and used batteries. The system can exploit differences in capital cost and wear characteristics of different batteries to make an optimally profitable system in a given grid deployment.

Figure 4:
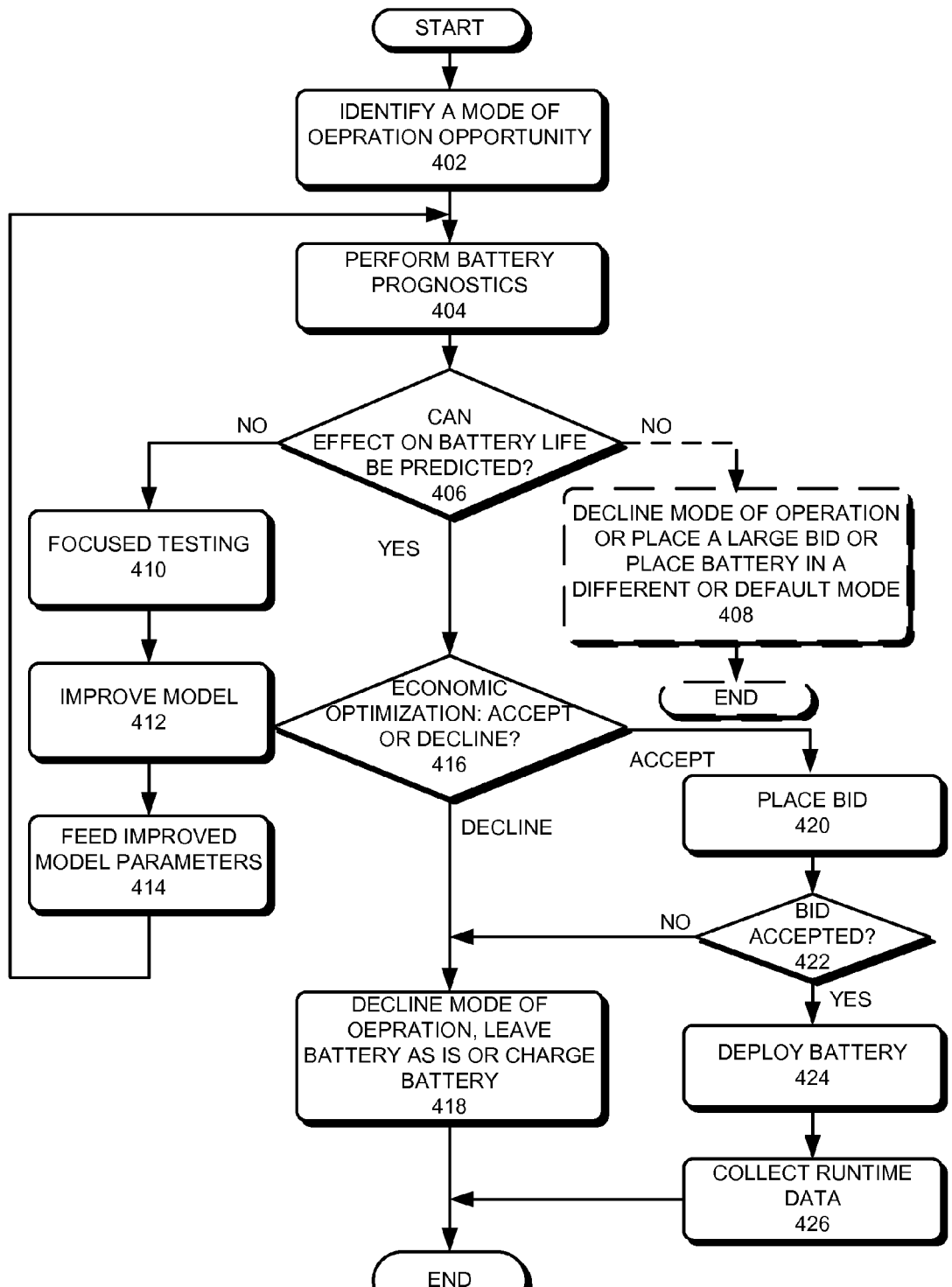
FIG. 4 presents a flowchart illustrating an exemplary operational process of the multi-mode controller, in accordance with an embodiment of the present invention.

FIG. 4 presents a flowchart illustrating an exemplary operational process of the multi-mode controller, in accordance with an embodiment of the present invention. During operation, the system identifies a strategy for operation that includes at least one mode of operation opportunity (operation 402), and performs battery prognostics associated with the mode of operation (operation 404). The mode of operation opportunity may include but is not limited to: night-to-day arbitrage and providing ancillary services, such as spinning reserves, frequency regulation, etc. In some embodiments, several modes of operation may be identified together, such as night-to-day arbitrage combined with frequency regulation. In one embodiment, an economic optimizer identifies the mode of operation opportunity based on the current electricity market, and the battery prognostics are performed based on the operation mode of the battery. For example, if the mode of operation opportunity is to provide frequency regulation, the battery prognostics are performed based on the battery operating in the frequency regulation mode. Note that in order to obtain an accurate prognostic outcome, the system needs to know the current SOC and SOH of the battery, as well as the cost to the battery lifecycle from deployment. Based on the operating mode, current SOC and SOH of the battery, and available battery models, the system determines whether the effect of deployment on battery life can be accurately predicted (operation 406). In the example of frequency regulation, the system needs to use battery models built for the operating mode of the frequency regulation. In one embodiment, the system determines whether the prognostics error exceeds a predetermined threshold. In a further embodiment, the system may model the accuracy of the prognostics, and allow operations with high prognostics error, as long as the revenue is high enough. Note that the prognostics error may be an absolute value or a percentage. If there is insufficient information to predict the battery life and/or the cost of running the battery for providing the service, or if the prognostic error exceeds the threshold, the system optionally declines the mode of operation opportunity, or places a large bid to make sure that the mode of operation is used with a large margin of error in the accuracy of the prognostics (operation 408). In addition, if the prognostic model is insufficient to warrant bidding on the mode of operation, the economic optimization module either chooses a different mode of operation, or uses a default mode of operation such as leaving the battery as is or charging the battery slowly (operation 408). For example, the available battery resource may be a particular type of battery, and the system may lack modeling information for this type of battery under the corresponding operating conditions, such as current SOH, SOC, desired cycle frequency, etc. Note that because battery operations are often nonlinear, a generic model for a particular battery type is not sufficient for predicting battery life under different operating conditions. For example, an aged battery may perform and degrade differently from a new battery, or a nearly charge-depleted battery may perform and degrade differently from a fully charged battery under a given operating mode. To accurately model the wear on the battery it is beneficial to use models that include parameters such as the current SOH, the current SOC, and any recent history that, for example, might affect the temperature or chemistry of the battery. The lack of accurate modeling can result in the system failing to predict the change in the SOH of a battery due to a particular type of deployment and, thus, fail to predict the cost of running the battery. In other words, the system does not know whether the economic value that may be lost due to wear to the battery can be offset by economic value that may be gained from deploying the battery for frequency regulation. In response to the insufficient cost knowledge, the system can also perform focused testing (operation 410), improve the battery models based on the test outcome (operation 412), and feed the improved model parameters back to the battery prognostics module (operation 414). In one embodiment, updated prognostics can be performed based on the improved model parameters. Note that the focused testing may include online testing (which might involve operating an asset connected to the grid in a particular pattern and measuring a characteristic of the asset (e.g. temperature or state of charge) while it is being used and/or after it is used), offline testing (which might involve disconnecting the asset from grid operation for the purpose of performing tests (e.g. a specialized state of health measurement)), and laboratory testing (which is typically performed on artifacts that are similar to the asset (e.g. a cell of the same type as a battery)). For example, the modeling of an aged battery may involve performing a test on that battery or on a battery of a similar age.

If the system determines that the effect of deployment on battery life (in terms of the cost of running the battery) can be accurately predicted, economic optimization is performed to determine whether to accept or decline the mode of operation opportunity (operation 416). If the economic optimization determines that it is not likely to be profitable over a certain time scale to use the battery for the regulation service, the system declines the mode of operation opportunity and then either leaves the battery as is or charges the battery (operation 418). If the economic optimization determines that it is likely to be profitable over a certain time scale to use the battery for the mode of operation, the system can then bid in the electricity market associated with the mode of operation such as bidding to provide frequency regulation ancillary service (operation 420), and determines whether the bid is accepted (operation 422). If the bid is accepted, and the system subsequently deploy the battery for performing the multi-mode (in contrast to the single arbitrage mode) operation (operation 424), and collects runtime data (operation 426). For example, the battery may be placed in a sequence of different operating modes that may include a series of charging-discharging cycles. This runtime data can also include measurements of SOC and SOH during or after battery deployment. The collected runtime data can be used for improving the prognostic models. If the bid is not accepted, the battery is left as is or remains in the charging state (operation 418).

Computer System

Figure 5:
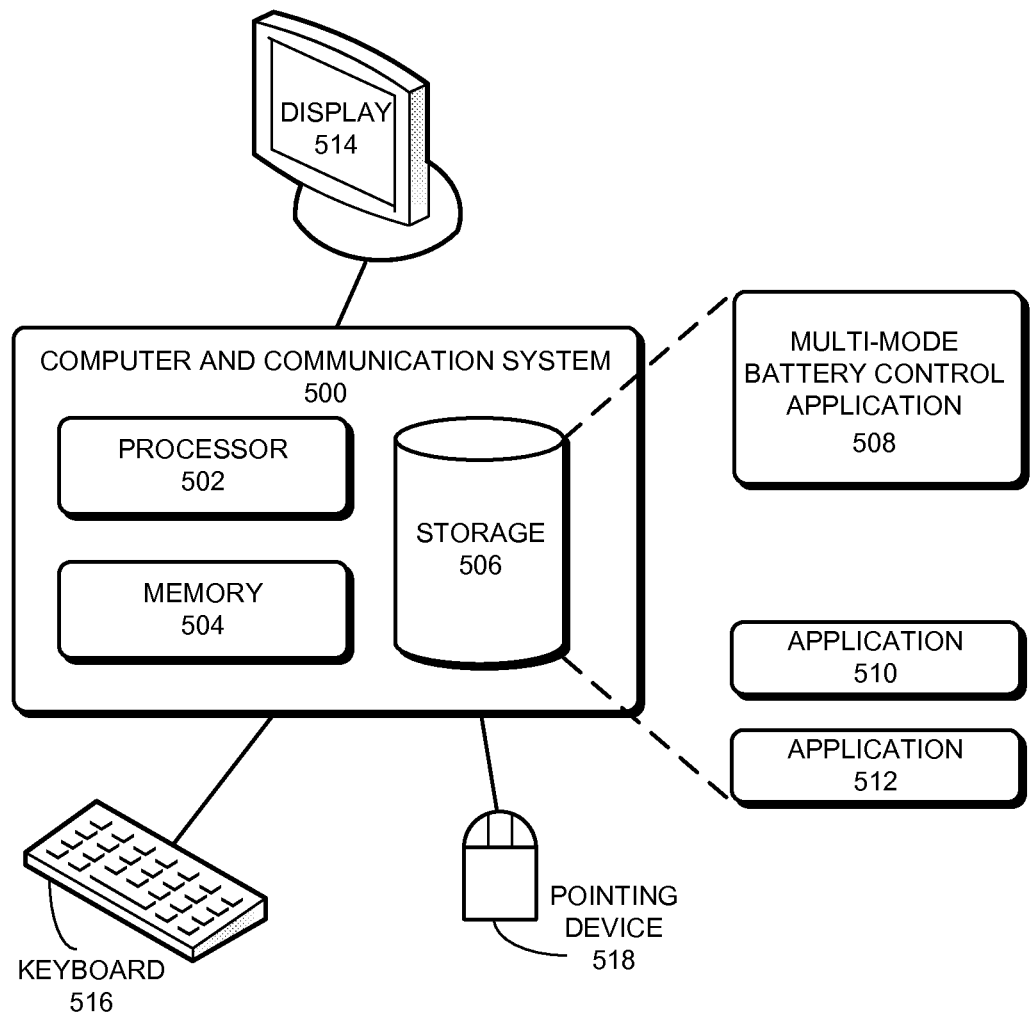
FIG. 5 illustrates an exemplary computer system for providing multi-mode battery control, in accordance with one embodiment of the present invention.

FIG. 5 illustrates an exemplary computer system for providing multi-mode battery control, in accordance with one embodiment of the present invention. In one embodiment, a computer and communication system 500 includes a processor 502, a memory 504, and a storage device 506. Storage device 506 stores a multi-mode battery control application 508, as well as other applications, such as applications 510 and 512. During operation, multi-mode battery control application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

Embodiments of the present invention provide a multi-mode energy asset management framework that is agile to revenue opportunities, flexible to the asset type connected to the grid, and adapts to the state of the energy asset. The economic optimization layer employs an optimal bidding strategy to allow multi-mode (in contrast to the traditional single arbitrage mode) utilization of energy assets. Moreover, the system includes a standard testing protocol (run by the modeling and testing layer) for energy assets to be deployed on the grid.

While it will be understood that the above described architecture can be applied to a variety of grid-tied assets, in some embodiments, the asset is a battery. The testing protocol can be used to demonstrate how SOC and SOH of the battery change while the battery is used on the grid. The resulting battery wear function can be fed into the coupled battery/market model to determine how a given battery can be profitable in a grid market. Note that the market model is used as part of the input to the battery wear function and the appropriate cycles to use in the testing protocol.

The testing protocol specifies a measure of SOC and SOH (with error bars) of the battery, and can demonstrate how various stochastic cycles of both temperature and usage are related to single-stressor tests. As real-world usage profiles will necessarily have more than one time-varying parameter, the model must be shown experimentally to be robust against concurrent cycles of multiple stressors. The testing protocol may further specify how to appropriately accomplish accelerated life testing, such as using elevated temperature; and include alternative orthogonal tests, such as extrapolation from tests on small cells. Additionally, the testing protocol may demonstrate the history-independence of the SOC and SOH measures, which is particularly important when used batteries are deployed.

The system further provides an abstracted, high-level parameterized model whose parameters can be identified and updated based on real-time data. More specifically, focused testing, instead of exhaustive testing, can be performed to update the model parameters, thus providing model adaptability. The adaptive battery model allows concurrent deployment of heterogeneous battery chemistries and batteries at different stages of health with different usage histories.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for utilizing an energy asset to provide one or more modes of operation services to an energy grid, comprising:
   identifying, by a computer, at least one opportunity associated with a mode of operation for the energy asset within the energy grid based on market conditions;
   performing, by the computer, a prognostic analysis of an operation of the energy asset in the same mode, based on an existing energy asset unit model of the energy asset, wherein the model comprises a set of parameters which indicate at least one of: time, a temperature of the asset, and a discharge rate of the asset;
   receiving, by the computer from a sensor, information characterizing a state of health (SOH) of the energy asset during a recent usage in the same mode of operation within the energy grid;
   determining a mismatch between the SOH during the usage and a predicted SOH from the prognostic analysis;

updating the set of parameters of the model for the same asset based on the SOH during the usage, resulting in an updated model;
refining the prognostic analysis based on the updated model;
determining, by the computer, an increased confidence level in the refined prognostic analysis that exceeds a predetermined threshold; and
controlling, by an operation controller, the same energy asset to operate in the same mode of operation within the energy grid, based on the updated model of the energy asset and an expected profit.

2. The method of claim 1, wherein controlling the energy asset based on the updated model and the expected profit further comprises:
performing an economic transaction which involves placing a bid for the mode of operation opportunity and receiving a notice that the bid is accepted; and
in response to the economic transaction, placing the energy asset in the operation mode in the grid associated with the opportunity, wherein the operation mode includes one or more of:
night-to-day arbitrage;
contingency reserves; and
voltage support.

3. The method of claim 1, further comprising:
in response to detecting the mismatch or the determined confidence level below the predetermined threshold, identifying one or more focused tests;
performing an identified focused test for the energy asset based on the mode of operation opportunity; and
improving the model of the energy asset based on outcomes of the focused test, thereby enabling better future prognostics for the energy asset.

4. The method of claim 3, further comprising:
performing a second prognostic analysis using the improved model; and
performing an economic optimization based on outcomes of the second prognostic analysis.

5. The method of claim 3, wherein identifying the one or more focused test involves performing one or more of following economic analyses:
a sensitivity analysis;
an entropy measure analysis; and
a decision theoretic analysis.

6. The method of claim 3, wherein the focused test includes one or more of:
an online test;
an offline test; and
a laboratory test.

7. The method of claim 3, further comprising placing the improved model in a model library.

8. The method of claim 1, further comprising:
in response to the determined confidence level being below the predetermined threshold, placing a bid larger than an expected lifecycle cost of the energy asset based on an uncertainty about battery wear to reduce a likelihood of an unprofitable operation; and
in response to the large bid not being accepted:
performing a focused test to improve confidence in a value of a respective parameter for the energy asset, wherein the focused test comprises measuring a characteristic of the asset during an online usage of the asset within the grid; and
improving the energy asset unit model based on outcomes of the focused test, thereby enabling better future prognostics for the energy asset.

9. The method of claim 1, wherein the energy asset includes a grid-tied energy storage device, and wherein the grid-tied energy storage device includes a heterogeneous mixture of energy storage devices that includes one or more of:
a flywheel;
a super capacitor;
a plugged-in electrical vehicle;
a Li-ion battery;
a lead-acid battery;
a nickel metal hydride (NiMH) battery;
a flow battery;
a new battery; and
a used battery.

10. The method of claim 1, wherein the prognostic analysis is performed based on a current health condition of the grid-tied energy storage device.

11. The method of claim 1, wherein the energy asset unit model includes one or more of:
a battery cell-level model;
a battery pack-level model; and
a circuit-based archetype battery model.

12. The method of claim 1, wherein the operation mode associated with the opportunity includes one or more of:
night-to-day energy arbitrage;
voltage support;
contingency reserves;
frequency control; and
regulation.

13. The method of claim 1, wherein the energy asset includes one or more of:
a battery;
a backup energy generator;
a fuel cell; and
a demand-response load management system.

14. A non-transitory computer-readable storage medium storing instructions that when executed by a computer cause the computer to perform a method for utilizing an energy asset to provide one or more modes of operation services to an energy grid, the method comprising:
identifying, by the computer, at least one opportunity associated with a mode of operation for the energy asset within the energy grid based on market conditions;
performing, by the computer, a prognostic analysis of an operation of the energy asset in the same mode, based on an existing energy asset unit model of the energy asset, wherein the model comprises a set of parameters which indicate at least one of: time, a temperature of the asset, and a discharge rate of the asset;
receiving, by the computer from a sensor, information characterizing a state of health (SOH) of the energy asset during a recent usage in the same mode of operation within the energy grid;
in response to determining a mismatch between the SOH during the usage and a predicted SOH from the prognostic analysis, refining the set of parameters of the model for the same asset based on the SOH during the usage, resulting in an updated model, and refining the prognostic analysis based on the updated model; and
in response to determining, by the computer, an increased confidence level in the refined prognostic analysis that exceeds a predetermined threshold:
sending instructions to an operation controller, to control the same energy asset to operate in the same mode of operation within the energy grid, based on the updated model of the energy asset and an expected profit.

15. The non-transitory computer-readable storage medium of claim 14, wherein sending instructions to the operation controller to deploy the energy asset based on the updated model and the expected profit further comprises:
performing an economic transaction which involves placing a bid for the mode of operation opportunity and receiving a notice that the bid is accepted; and
in response to the economic transaction, placing the energy asset in the operation mode in the grid associated with the opportunity, wherein the operation mode includes one or more of:
night-to-day arbitrage;
contingency reserves; and
voltage support.

16. The non-transitory computer-readable storage medium of claim 14, wherein the method further comprises:
in response to detecting the mismatch or the determined confidence level below the predetermined threshold, identifying one or more focused tests;
performing an identified focused test for the energy asset based on the mode of operation opportunity; and
improving the model of the energy asset based on outcomes of the focused test, thereby enabling better future prognostics for the energy asset.

17. The non-transitory computer-readable storage medium of claim 16, wherein the method further comprises:
performing a second prognostic analysis using the improved model;
performing an economic optimization based on outcomes of the second prognostic analysis.

18. The non-transitory computer-readable storage medium of claim 16, wherein identifying the one or more focused test involves performing one or more of following economic analyses:
a sensitivity analysis;
an entropy measure; and
a decision theoretic analysis.

19. The non-transitory computer-readable storage medium of claim 16, wherein the focused test includes one or more of:
an online test;
an offline test; and
a laboratory test.

20. The non-transitory computer-readable storage medium of claim 16, wherein the method further comprises placing the improved model in a model library.

21. The non-transitory computer-readable storage medium of claim 14, wherein the method further comprises:
in response to the determined confidence level being below the predetermined threshold, placing a bid larger than an expected lifecycle cost of the energy asset based on an uncertainty about battery wear to reduce a likelihood of an unprofitable operation; and
in response to the large bid not being accepted:
performing a focused test to improve confidence in a value of a respective parameter for the energy asset, wherein the focused test comprises measuring a characteristic of the asset during an online usage of the asset within the grid; and
improving the energy asset unit model based on outcomes of the focused
test, thereby enabling better future prognostics for the energy asset.

22. The non-transitory computer-readable storage medium of claim 14, wherein the energy asset includes a grid-tied energy storage device, and wherein the grid-tied energy storage device includes a heterogeneous mixture of batteries that includes one or more of:
a flywheel;
a super capacitor;
a plugged-in electrical vehicle;
a Li-ion battery;
a lead-acid battery;
a nickel metal hydride (NiMH) battery;
a flow battery;
a new battery; and
a used battery.

23. The non-transitory computer-readable storage medium of claim 22, wherein the prognostic analysis is performed based on a current health condition of the grid-tied energy storage device.

24. The non-transitory computer-readable storage medium of claim 22, wherein the energy asset unit model includes one or more of:
a battery cell-level model;
a battery pack-level model; and
a circuit-based archetype battery model.

25. The non-transitory computer-readable storage medium of claim 14, wherein the operation mode associated with the opportunity includes one or more of:
night-to-day energy arbitrage;
voltage support;
contingency reserves;
frequency control; and
regulation.

26. The non-transitory computer-readable storage medium of claim 14, wherein the energy asset includes one or more of:
a battery;
a backup energy generator;
a fuel cell; and
a demand-response load management system.

27. An energy-asset control system for utilizing an energy asset to provide one or more modes of operation services to an energy grid, comprising:
an economic optimizer configured to identify at least one opportunity associated with a mode of operation for the energy asset within the energy grid based on market conditions;
a prognostics module configured to:
perform a prognostic analysis of an operation of the energy asset in the same mode, based on an existing energy asset unit model of the energy asset, wherein the model comprises a set of parameters which indicate at least one of: time, a temperature of the asset, and a discharge rate of the asset;
receive, from a sensor, information characterizing a state of health (SOH) of the energy asset during a recent usage within the energy grid;
in response to determining a mismatch between the SOH during the usage and a predicted SOH from the prognostic analysis, updating the set of parameters of the model for the same asset based on the SOH during the usage, resulting in an updated model, and refining the prognostic analysis based on the updated model; and
an operation controller that can control the same energy asset to operate in the same mode of operation, within the energy grid;
wherein the economic optimizer is further configured to:
in response to determining an increased confidence level in the refined prognostic analysis that exceeds a predetermined threshold:

send instructions to the operation controller to deploy the same energy asset to operate in the same mode of operation within the energy grid, based on the updated model of the energy asset and an expected profit.

28. The energy-asset control system of claim 27, wherein while sending instructions to the operation controller to deploy the energy asset based on the updated model and the expected profit, the economic optimizer is configured to perform an economic transaction which involves placing a bid for the mode of operation opportunity and receiving a notice that the bid is accepted; and
wherein the operation controller is configured to, in response to the economic transaction, place the energy asset in the operation mode in the grid associated with the opportunity, wherein the operation mode includes one or more of:
night-to-day arbitrage;
contingency reserves; and
voltage support.

29. The energy-asset control system of claim 27, wherein the economic optimizer is further configured to, in response to detecting the mismatch or the prognostics module determining the confidence level below the predetermined threshold, identify one or more focused tests, and wherein the energy-asset control system further comprises a focused testing module configured to:
perform an identified focused test for the energy asset based on the mode of operation opportunity; and
improve the model of the energy asset based on outcomes of the focused test, thereby enabling better future prognostics for the energy asset.

30. The energy-asset control system of claim 29,
wherein the prognostics module is configured to perform a second prognostic analysis using the improved model; and
wherein the economic optimizer is further configured to:
perform an economic optimization based on outcomes of the second prognostic analysis.

31. The energy-asset control system of claim 29, wherein while identifying the one or more focused tests, the economic optimizer is configured to perform one or more of the following economic analyses:
a sensitivity analysis;
an entropy measure analysis; and
a decision theoretic analysis.

32. The energy-asset control system of claim 29, wherein the focused test includes one or more of:
an online test;
an offline test; and
a laboratory test.

33. The energy-asset control system of claim 29, further comprising a model library configured to store the improved model.

34. The energy-asset control system of claim 27, wherein the economic optimizer is configured to, in response to the determined confidence level being below the predetermined threshold, place a bid larger than an expected lifecycle cost of the energy asset based on an uncertainty about battery wear to reduce a likelihood of an unprofitable operation.

35. The energy-asset control system of claim 27, wherein the energy asset includes a grid-tied energy storage device, and wherein the grid-tied energy storage device includes a heterogeneous mixture of batteries that includes one or more of:
a flywheel;
a super capacitor;
a plugged-in electrical vehicle;
a Li-ion battery;
a lead-acid battery;
a nickel metal hydride (NiMH) battery;
a flow battery;
a new battery; and
a used battery.

36. The energy-asset control system of claim 35, wherein the prognostic analysis is performed based on a current health condition of the grid-tied energy storage device.

37. The energy-asset control system of claim 35, wherein the energy asset unit model includes one or more of:
a battery cell-level model;
a battery pack-level model; and
a circuit-based archetype battery model.

38. The energy-asset control system of claim 27, wherein the operation mode associated with the opportunity includes one or more of:
night-to-day energy arbitrage;
voltage support;
contingency reserves;
frequency control; and
regulation.

39. The energy-asset control system of claim 27, wherein the energy asset includes one or more of:
a battery;
a backup energy generator;
a fuel cell; and
a demand-response load management system.

* * * * *